United States Patent [19]
Johnson

[11] Patent Number: 5,014,190
[45] Date of Patent: May 7, 1991

[54] DATA PROCESSING SYSTEM

[75] Inventor: Nigel L. Johnson, Wisbech, England

[73] Assignee: U.S. Philips Corporation, New York, N.Y.

[21] Appl. No.: 116,414

[22] Filed: Nov. 2, 1987

[30] Foreign Application Priority Data

Nov. 3, 1986 [GB] United Kingdom ............... 8626198

[51] Int. Cl.⁵ .......................................... G06F 11/00
[52] U.S. Cl. ................................ 364/200; 364/267.9; 364/265.6; 364/268.9; 371/16.3
[58] Field of Search ... 364/200 MS File, 900 MS File; 371/62, 16.3, 66

[56] References Cited

U.S. PATENT DOCUMENTS

| | | | |
|---|---|---|---|
| 4,405,982 | 9/1983 | Ruhnau et al. | 364/200 |
| 4,586,179 | 4/1986 | Sirazi et al. | 371/16.3 |
| 4,594,685 | 6/1986 | Owens | 371/16.3 |
| 4,597,052 | 6/1986 | Matsuda | 364/200 |
| 4,600,987 | 7/1986 | Nambudiri | 371/16.3 |
| 4,618,953 | 10/1986 | Daniels et al. | 364/200 |
| 4,627,060 | 12/1986 | Huang et al. | 364/200 |
| 4,752,930 | 6/1988 | Kitamura et al. | 371/62 |
| 4,763,296 | 8/1988 | Gercekci | 371/62 |
| 4,796,211 | 1/1989 | Yokouchi et al. | 371/62 |
| 4,803,682 | 2/1989 | Hara et al. | 371/16.3 |
| 4,809,280 | 2/1989 | Shonaka | 371/16.3 |
| 4,879,647 | 11/1989 | Yazawa | 371/16.3 |

Primary Examiner—Michael R. Fleming
Assistant Examiner—Debra A. Chun
Attorney, Agent, or Firm—Anne E. Barschall

[57] ABSTRACT

A data processing system includes a microcomputer (1) and a watchdog circuit arrangement which includes a clocked counter (17) having an output $Q_n$ which is coupled to a reset input (RST) of the microcomputer. In order to increase the kinds of microcomputer malfunctions to which the watchdog circuit responds, the microcomputer is programmed to repeatedly generate predetermined reset signal bytes within respective time windows, such time windows corresponding to periods during which a further output $Q_{n-1}$ of the counter is logic "1". The reset signal byte supplied by the microcomputer is compared by a comparator (10) with the predetermined reset signal byte, which is supplied thereto by a switched multiplexor (13), and if they match the output signal from the comparator resets the counter. Each time this occurs the microcomputer strobes the watchdog circuit by applying its address to a further input (22, 46) thereof. If a reset signal byte should be supplied by the microcomputer outside a time window and/or if such signal byte is incorrect, the resulting signal level at the output of the comparator, which is stored in a flip-flop (15), actuates the watchdog circuit to produce an output signal which resets the microcomputer. The logic value of the $Q_{n-1}$ signal from the counter is periodically ascertained by the microcomputer to determine the subsequent time window during which the next reset signal byte is to be generated.

15 Claims, 2 Drawing Sheets

DATA PROCESSING SYSTEM

BACKGROUND OF THE INVENTION

1. Field of the Invention

This invention relates to a programmed digital data processing system including a watch-dog circuit arrangement, which arrangement comprises timer means coupled to a reset signal input, said arrangement being arranged to generate an output signal should the time interval between successive resets of said timer means exceed a predetermined length, to generate a further signal at intervals which do not exceed said predetermined length, and to also generate said output signal should a reset signal be supplied to said reset signal input while the further signal is absent. The system is programmed to supply a reset signal to said reset signal input, and thereby reset the timer means, during each occurrence of said further signal; and to respond to said output signal by assuming a predetermined operating state.

2. Description of the Related Art

A system of the above kind is disclosed in GB-A-2 065 939.

Watch-dog circuit arrangements in general are well-known, and serve to monitor the correct implementation of a data processing system program. The timer means may, for example, take the form of a continuously clocked counter which produces an output signal should the count therein reach a predetermined value or its capacity is exceeded, the counter having a reset input at which a reset signal applied thereto results in the counter contents being set to zero. The data processing system may comprise a suitably programmed microcomputer, a single bit-line of one of the output ports of which is coupled to the reset input of the counter. The computer is programmed in such a way that a signal which resets the counter is periodically applied to the signal bit-line at such a rate that the counter is always reset before its contents reach the value at which it would generate the output signal. Thus in normal operation the counter never produces an output signal. If, however, the implementation of the program should cease for some reason, resulting in the resetting of the counter also ceasing, then the counter contents will eventually reach said predetermined value. The resulting output signal may, for example, be applied to a general reset input of the microcomputer, so that the microcomputer is itself reset under these circumstances. A similar result is obtained if the microcomputer should incorrectly enter a program loop which does not include a step entailing the application of a reset signal to the counter, or which does include such a step but in which this step is repeated insufficiently frequently to prevent the counter contents reaching said value.

The aforesaid patent specification GB-A-2 065 939 discloses an elaboration of such a basic circuit arrangement which is arranged to also generate an output signal to reset the microcomputer should the time interval between successive occurrences of the timer reset signals be less than a predetermined value, thereby also resetting the microcomputer if it should incorrectly enter a short program loop in which steps resulting in the application of reset signals to the timer occur too frequently. To this end the reset signal input of the microcomputer, in addition to being coupled to the reset input of the counter, is coupled to the output of the watch-dog arrangement at which the output signal occurs via an AND-function gate the other input of which is fed from the output of a decoder. The decoder is fed from selected stages of the counter, so that as long as the counter contents lie within a predetermined range (corresponding to the duration of a predetermined time interval after the occurrence of the immediately preceding timer reset signal) the decoder produces an output signal (the aforesaid further signal) which inhibits the gate.

Obviously, such a system has to be programmed to supply reset signals to the reset signal input of the microcomputer during normal operation at intervals which are such that each reset signal occurs within the predetermined time interval after the occurrence of the last such reset signal. This is fairly easy to arrange if the system program consists of a single loop the various steps of which, and only these steps, are performed for each cycle round the loop. However, many programs do not take this simple form. For example, routines may or may not be called, and/or different branches may be taken in dependence upon current conditions. In such cases it can be difficult and time-consuming for a programmer to ensure that timer reset signals are always generated in normal operation at the correct rate. It is an object of the invention to mitigate this disadvantage.

SUMMARY OF THE INVENTION

According to the invention a programmed digital data processing system as defined in the first paragraph is characterised in that said system is programmed to periodically test for the presence of said further signal, to respond to detection of the presence thereof by supplying a reset signal to said reset signal input while said further signal is still present, and to perform further program steps during the time between each detection of the presence of said further signal and the subsequent reset signal supplied in response thereto.

It has been recognised that the programmer's task in respect of the required generation of the reset signals at the correct rate can be considerably eased if he provides test steps for the presence of the said further signal throughout the program, and programs the system to generate a reset signal while the further signal is still present in response to a positive result from such a test. A sufficient number of these test steps must be included in the program to ensure that a resulting reset signal is generated during each occurrence of the further signal, but there is no inherent upper limit on the number of these test steps which can be provided. Of course, if the program were such that a reset signal is generated immediately if a test step indicates the presence of the further signal, the advantage of providing the further signal during the presence of which reset signals must be supplied to the timer means would be largely lost; the entering of the program into a short loop which contains a test step and a step involving the consequential generation of a reset signal if the result of the test is positive would still result in the generation of a reset signal during each occurrence of the further signal and none at other times. However, because it is arranged that further program steps are performed between each detection of the presence of the further signal and the subsequent supply of a reset signal in response, it will be quite likely that a short program loop entered erroneously will contain either a test step for detecting the presence of the further signal, or a step involving the supply of a timer reset signal, but not both.

The further signal may be generated independently of the operation of the timer means. However, preferably, the start of each interval during which the further signal is present has a predetermined relationship to, and is spaced in time from, the instant of occurrence of the reset signal which immediately precedes it. If this is the case the further signal may be derived from the timer means. For example, if the timer means comprises a continuously clocked binary counter having a reset input to which the reset signal is coupled, the further signal may be derived from a single bit position or positions of the counter contents, for example by means of a decoder. Another advantage of providing such a predetermined relationship is that it can prevent the possibility of two successive tests for the presence of the further signal giving positive results for what is in fact only a single presence of the further signal, which possibility could otherwise give rise to a reset signal (in response to the second test) occurring after the further signal has ceased.

If the system comprises a programmed microcomputer provided with an external address latch the address latch and the watch-dog circuit arrangement are preferably integrated on the same semiconductor chip.

The system may be programmed to supply each said reset signal in the form of a multibit word having a predetermined value, and the watch-dog arrangement may be arranged to also generate a said output signal should a reset signal supplied to the reset signal input not have the predetermined value.

Arranging that each reset signal is in the form of a multibit word having a predetermined value, and that the watch-dog arrangement generates an output signal should each reset signal applied thereto not have the predetermined value can, for example, enable several bit lines through which the respective bits of the reset signals may be applied to the watch-dog arrangement to be tested for correct function. These bit lines (if present) may be connected, for example, to respective bit-outputs of an output port of a suitably programmed microcomputer which may form part of the system, which port can therefore itself be tested.

If it is arranged that the predetermined value changes for successive reset signals in accordance with a cyclic sequence, the likelihood that, should the program erroneously enter a short loop, the correct predetermined values will be applied to the reset signal input at a sufficient rate to prevent the timer means from generating an output signal, can be much less than the likelihood that a conventional watch-dog arrangement would be prevented from generating an output signal in the same circumstances. In principle, such a cyclic sequence can contain any number of different predetermined values. Preferably, however, it consists of only two, enabling each to be derived from the other; each may be, for example, the compliment of the other, for example a byte consisting of alternate "0"s and "1"s enabling a check to be made on cross-talk between adjoining bits, and be stored at a single location in RAM. Each time a reset signal is required the single location can be read and rewritten, and the contents of the single location can be complemented at some state between each reset signal and the next. If these operations are separated in time in the program it will be unlikely that they will be carried out in the correct order and at an adequate rage should the program function incorrectly. Moreover, storage in RAM provides a check on the relevant part of RAM being incorrectly overwritten in response to erroneous operation of the program.

BRIEF DESCRIPTION OF THE DRAWINGS

An embodiment of the invention will now be described, by way of example, with reference to the accompanying diagramatic drawings in which.

DESCRIPTION OF PREFERRED EMBODIMENTS

Figure 1:
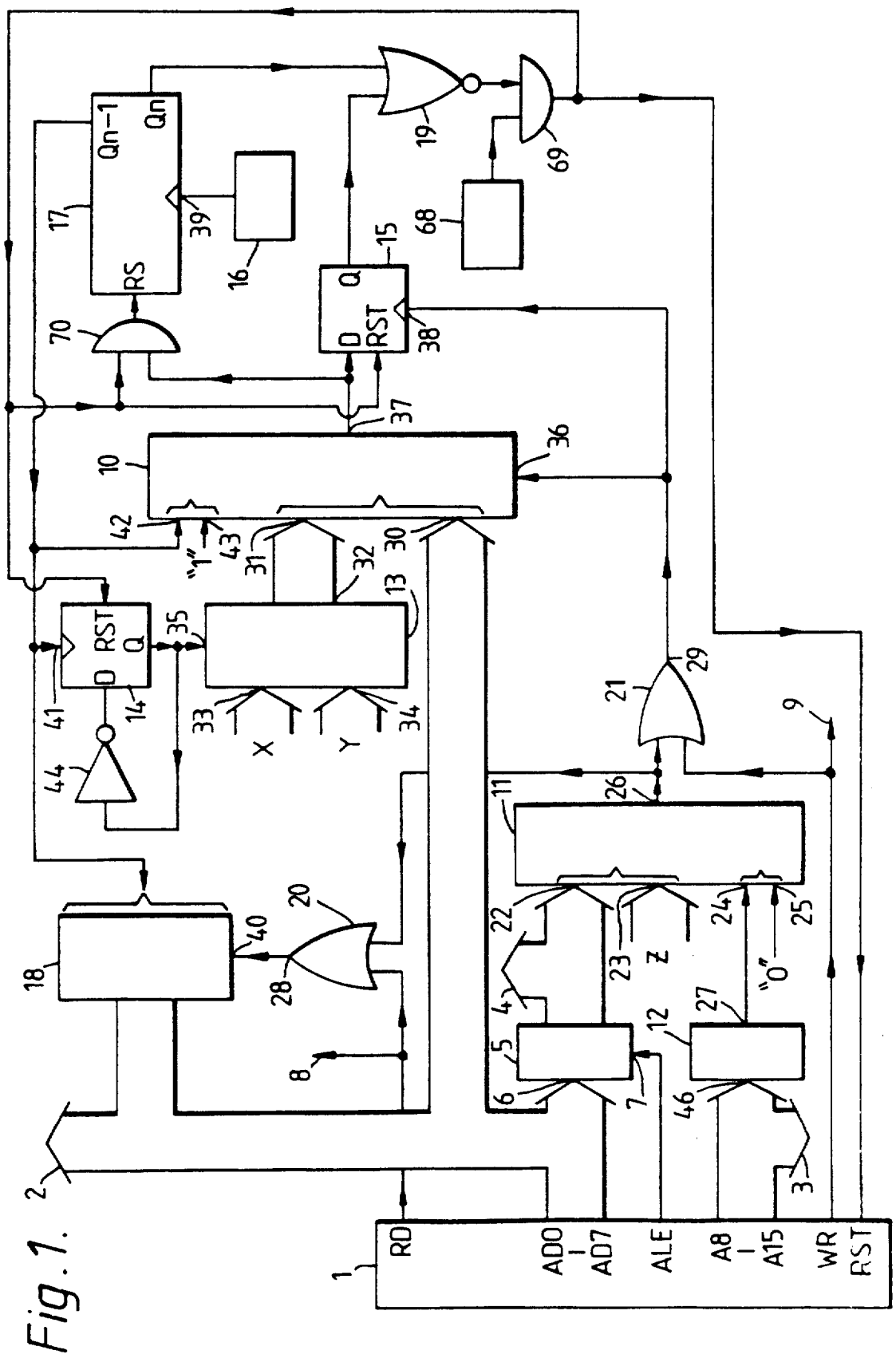
FIG. 1 is a block diagram of the embodiment.

FIG. 1 shows a programmed digital data processing system which comprises a programmed microcomputer 1 provided with an external address latch 5, and a watch-dog circuit arrangement.

Microcomputer 1 has lower order combined address and data bus lines AD0 . . . AD7 and higher order address bus lines A8 . . . A15 which may be coupled to other parts (not shown) of the system, for example to a program and/or data store, as indicated at 2, 3 and 4. Because the bus lines AD0 . . . AD7 have a dual function of the address latch 5 is provided in known manner. When microcomputer 1 outputs a 16-bit address it also outputs an address latch enable signal at an output ALE which is connected to a strobe input 7 of the latch 5. This signal causes latch 5 to store the eight lower order address bits presented to its input 6 and apply them to, inter alia, the output 4, the eight higher order address bits being applied to the output 3, after which the address/data but line AD0 . . . AD7 become available for the inputting to and/or outputting from microcomputer 1 of data bits, inter alia via the data input/output 2. Microcomputer 1 also has in known manner an output RD for an active-low read control signal, an output WR for an active-low write control signal and an input RST for an active-low reset signal. Outputs RD and WR may be coupled to other parts (not shown) of the system as indicated diagrammatically at 8 and 9.

The watch-dog arrangement comprises first and second comparators 10 and 11, an eight-into-one decoder 12, a two-into-one multiplexer 13, a frequency divider-by-two formed by a D-type flip-flop 14 the output Q of which is connected to its data input D via an inverter 44, a D-type flip-flop 15, a clock pulse source 16, a counter 17, an eight-bit-wide output buffer 18, a power-up reset pulse generator 68, two AND-gates 69 and 70, a NOR-gate 19, and two OR-gates 20 and 21. The output of latch 5 is connected to an eight-bit wide first input 22 of comparator 11, a fixed eight-bit byte Z being applied to an eight-bit-wide second input 23 thereof. The (active-low) output 27 of decoder 12 is connected to a single-bit-wide third input 24 of comparator 11 to a single-bit-wide fourth input 25 of which a fixed logic "0" signal is applied. Comparator 11 compares the group of bits applied to its input 22 with the group of bits applied to its input 23, and compares the bit applied to its input 24 with the bit applied to its input 25, and generates logic "0" at its output 26 if and only if correspondence occurs in both cases. Decoder 12 generates logic "0" at its output 27 if and only if microcomputer 1 generates a specific group of bits on the bit lines A8 . . . A15 which are connected to the decoder input 46. Thus the arrangement 11, 12 constitutes an address decoder for the watch-dog arrangement; comparator 11 generates logic "0" on its output 26 if and only if microcomputer 1 generates an address the eight lower-order bits of which correspond to the byte Z and the eight higher-order bits of which correspond to the bit group to which decoder 12 responds. Thus the comparator input 22 and the decoder input 46 together constitute a strobe signal input of the watch-dog. The comparator output 26 is connected to one input of each of the OR-gates 20 and 21, to second inputs of which are connected the microcomputer outputs RD and WR respectively. Thus gate 20 generates logic "0" on its output 28 if and only if microcomputer 1 addresses (strobes) the watch-dog and also generates an active-low read signal, and gate 21 generates logic "0" on its output 29 if and only if microcomputer 1 addresses (strobes) the watch-dog and also generates an active-low write signal.

The address/data bit lines AD0 . . . AD7 are also connected to an eight-bit-wide first input 30 of comparator 10, to a second eight-bit-wide input 31 of which is connected the eight-bit-wide output 32 of multiplexer 13. The two eight-bit-wide inputs 33 and 34 of multiplexer 13 are fed with fixed eight-bit bytes X and Y respectively. The control input 35 of multiplexer 13 is fed by the output of divider-by-two flip-flop 14. Comparator 10 has an active-low strobe signal input 36 which is connected to the output 29 of gate 21. The output 37 of comparator 10 is connected both to the data input D of flip-flop 15 directly and also via AND-gate 70 to the (active-low) reset input RS of counter 17. The (negative-edge-responsive) clock input 38 of flip-flop 15 is connected to the output of gate 21 and the clock input 39 of counter 17 is connected to the output of clock signal generator 16. The two inputs of gate 19 are connected to the output Q of flip-flop 15 and to the most significant bit output Qn of counter 17 respectively, the output of gate 19 being connected via AND-gate 69 to the active-low input RST of microcomputer 1, to the active-low asynchronous reset inputs RST of flip-flops 14 and 15, and to the second input of AND-gate 70. The second input of AND-gate 69 is fed from the output of the generator 68 which produces a logic "0" output pulse for a short time each time the system is powered up. Generator 68 may comprise, for example, a Schmitt trigger circuit the input of which is connected to one power supply line via a capacitor and to the other power supply line via a resistor. Thus microcomputer 1, flip-flops 14 and 15, and counter 17 are reset on power-up and also should either the output of flip-flop 15 or the most significant bit output of counter 17 become logic "1". When flip-flop 14 is in the reset state it controls multiplexer 13 to supply the byte X to the input 31 of comparator 10.

The most-significant-but-one bit output Qn-1 of counter 17 is coupled to all the bit lines AD0 . . . AD7 via the multiple output buffer 18, an active-low output-enable signal input 40 of which is connected to the output 28 of gate 20. The output Qn-1 of counter 17 is also connected to the (negative-edge-responsive) clock input 41 of divider-by-two flip-flop 14 and also to a single-bit third input 42 of comparator 10. A single-bit fourth input 43 of comparator 10 is supplied with a fixed logic "1" signal. The signal level on the output 37 of comparator 10 is normally logic "1". Comparator 10, if and only if a logic "0" level is present on its strobe input 36, compares the byte presented to its input 30 from the bit lines AD0 . . . AD7 with the byte (X or Y) presented to its input 31 by the multiplexer 13, and compares the level on its input 42 with the logic "1" presented to its input 43, and generates logic "0" on its output 37 if and only if correspondence occurs in both cases.

In operation microcomputer 1 addresses the watch-dog arrangement in two different modes, viz a read mode and a write mode in accordance with whether it produces a logic "0" on its output RD of a logic "0" on its output WR in conjunction with that address on the lines AD0 . . . A15 which results in the production by comparator 11 of logic "0" on its output 26. In the read mode the resulting enabling of the buffer 18 by the output signal of gate 20 causes this buffer to write the logic state of output Qn-1 of counter 18 onto the bus lines AD0–AD7 and hence to the microcomputer 1 which can thus ascertain what this logic state is. In the write mode (which in normal operation only occurs when the said logic state is "1"; see below) microcomputer 1 in normal operation puts that one of the bytes X and Y which is currently being presented to input 31 of comparator 10 by multiplexer 13 onto the bit lines AD0 . . . AD7. Assuming that output Qn-1 of counter 17 is in fact logic "1" comparator 10, strobed by the logic "0" fed to its input 36 by gate 21, produces logic "0" on its output 37. This logic "0" resets in contents of counter 17 to zero and is also stored in flip-flop 15 which is clocked by the negative-going transition on the output of gate 21. Both inputs of gate 19 are therefore logic "0", so that reset inputs RST of microcomputer 1 and flip-flops 14 and 15 are logic "1", i.e. no resets of these items occur. The resetting of timer/counter 17 results in the level at its output Qn-1 changing from logic "1" to logic "0", and this transition changes over the frequency divider-by-two flip-flop 14 to its other output state, thereby causing multiplexer 13 to feed the other of the bytes X and Y to input 31 of comparator 10. In normal operation the next time microcomputer 1 accesses the watch-dog in the write mode it is arranged to put this other byte onto the bit lines AD0 . . . AD7, so a similar result occurs to that just described. The bytes X and Y are put on to the bit lines AD0 . . . AD7 alternately for successive accesses of the watch-dog in the write-mode, input 30 of comparator 10 therefore constituting an 8-bit wide input for a reset signal for time-/counter 17.

A reset signal (logic "0") will be applied to microcomputer 1 and flip-flops 14 and 15 by gate 19 is either of the two inputs of gate 19 become logic "1" for some reason. A first way in which this can happen is because counter 17 (which is continuously clocked by source 16) is not reset sufficiently frequently to prevent its most significant bit output Qn from becoming logic "1". The program implemented by microcomputer 1 is arranged to contain watch-dog write operations at sufficiently short intervals to ensure that in normal operation this situation never occurs, provided that each such write operation gives the results set forth in the immediately preceding paragraph above. However, if the program implementation should stop for some reason, or should erroneously enter a program loop which does not include a watch-dog write operation, then it will be evident that output Qn of counter 17 will eventually become logic "1", resetting microcomputer 1 via gate 19 as required. A second way in which one of the two inputs of gate 19 will become logic "1", resetting microcomputer 1, is by the setting of flip-flop 15. Flip-flop 15 is clocked each time the watch-dog is addressed in the write mode, and if the correct byte X or Y should not then be present on the bit lines AD0 . . . AD7, so that comparator 10 fails to product logic "0" on its output 37 then logic "1" will be clocked into flip-flop 15, appear at its output Q and thus be applied to NOR-gate 19, resulting in a reset signal being applied immediately to microcomputer 1, i.e. without waiting for output Qn of counter 17 to become logic "1".

As a first point it should be noted that, in addition to the microcomputer being reset in response to the counter overflowing, in the system of FIG. 1 resetting of microcomputer 1 also occurs in response to the generation by microcomputer 1 of a byte other than the correct one, X or Y, on the address/data bit lines AD0 ... AD7 when the watch-dog is addressed in the write mode, because flip-flop 15 is set under these conditions. Thus microcomputer 1 will be reset should one or more of the bit outputs AD0 ... AD7 malfunction (and in fact also should one or more of the bit outputs A8 ... A15 malfunction). Moreover, it is much less likely that microcomputer 1 will erroneously enter a short program loop in which it produces the correct bytes X and Y alternately, so that the required resetting of the microcomputer does not in fact occur, than a loop in which merely a specific single output bit line is repeatedly written to, which would prevent resetting by means of the known arrangements. Furthermore, microcomputer 1 may be programmed to store these bytes in RAM, retrieving them and rewriting the retrieved byte each time they are required. If this is the case the watch-dog arrangement will provide a check on whether the relevant part of RAM becomes corrupted for some reason, for example if the program caused the relevant storage locations to be overwritten, as may occur in certain error situations. If this should occur a reset signal for the microcomputer will be automatically generated. The alternating bytes X and Y may each be derived from the other; each may be, for example, the complement of the other. If this is the case only a single RAM location will be required to store them, the microcomputer then being programmed to access this location each time X or Y is required, supply its contents to the watch-dog, and write the accessed byte back to the same location and, in between each pair of successive such accesses, convert the stored byte into the other. If this is the case the bytes X and Y are preferably 10101010 and 01010101 respectively, to provide some check on cross-talk between adjacent ones of the bit lines AD0 ... AD7.

As a second point, attention is drawn to the connection of the least significant bit but one output Qn-1 of counter 17 to input 42 of comparator 10 (in which the level on this output is compared with the logic "1" applied to input 43). This means that when the watch-dog is addressed in the write mode then, unless output Qn-1 is then logic "1", comparator 10 will not produce a logic "0" output signal even if microcomputer 1 then applies the correct byte X or Y to the bit-lines AD0 .. . AD7. In other words, if the watch-dog is addressed in the write mode at a time when output QN-1 of counter 17 is logic "0", flip-flop 15 will apply a reset signal to microcomputer 1 via gate 19. This feature can provide a further check on the correct implementation of the program in microcomputer 1, and is the reason for the provision of the output buffers 18 and the facility for addressing the watch-dog arrangement in the read mode. The microcomputer 1 is programmed to periodically address the watch-dog in the read mode to ascertain the logic state of output Qn-1 of counter 17 and thereby determine when this state has changed from "0" to "1" and set a flag when this has occurred. The write mode addressing steps also included in the program are arranged to actually take place, also resetting the flag, only if the flag is in fact set at the relevant time. The period of the rectangular-wave signal appearing at output Qn-1 is, of course, known, being determined by the output frequency of generator 16 and the capacity of counter 17. The frequency of the read-mode addressing steps and the interval between each such step and the next write-mode addressing step can therefore be chosen such as to ensure that, in normal operation, each time such a write-mode addressing step occurs, if the flag is set then the signal at output Qn-1 is still logic "1". (The condition for this is that the interval between each pair of successive read-mode addressing steps plus the interval between the second of these steps and the next write mode addressing step must be less than half the period which the signal as output Qn-1 would have were counter 17 allowed to run freely.) If, within this constraint, each write mode addressing step is spaced in time as far as possible in the program from the immediately preceding read mode addressing step this will reduce the likelihood that, should a short program loop entered by microcomputer 1 actually include a watch-dog write-mode addressing step, it will also include the watch-dog read-mode addressing step required to prime it. A further advantage of testing output Qn-1 and only writing to the watch-dog when the level thereat has changed from "0" to "1" is that the repetition rate of the watch-dog write operations is automatically adjusted to lie between one half and one times the frequency of the signal at output Qn-1, enabling this repetition rate to be optimised and to be little dependent on what branches the program actually takes each time it is carried out.

Figure 2:
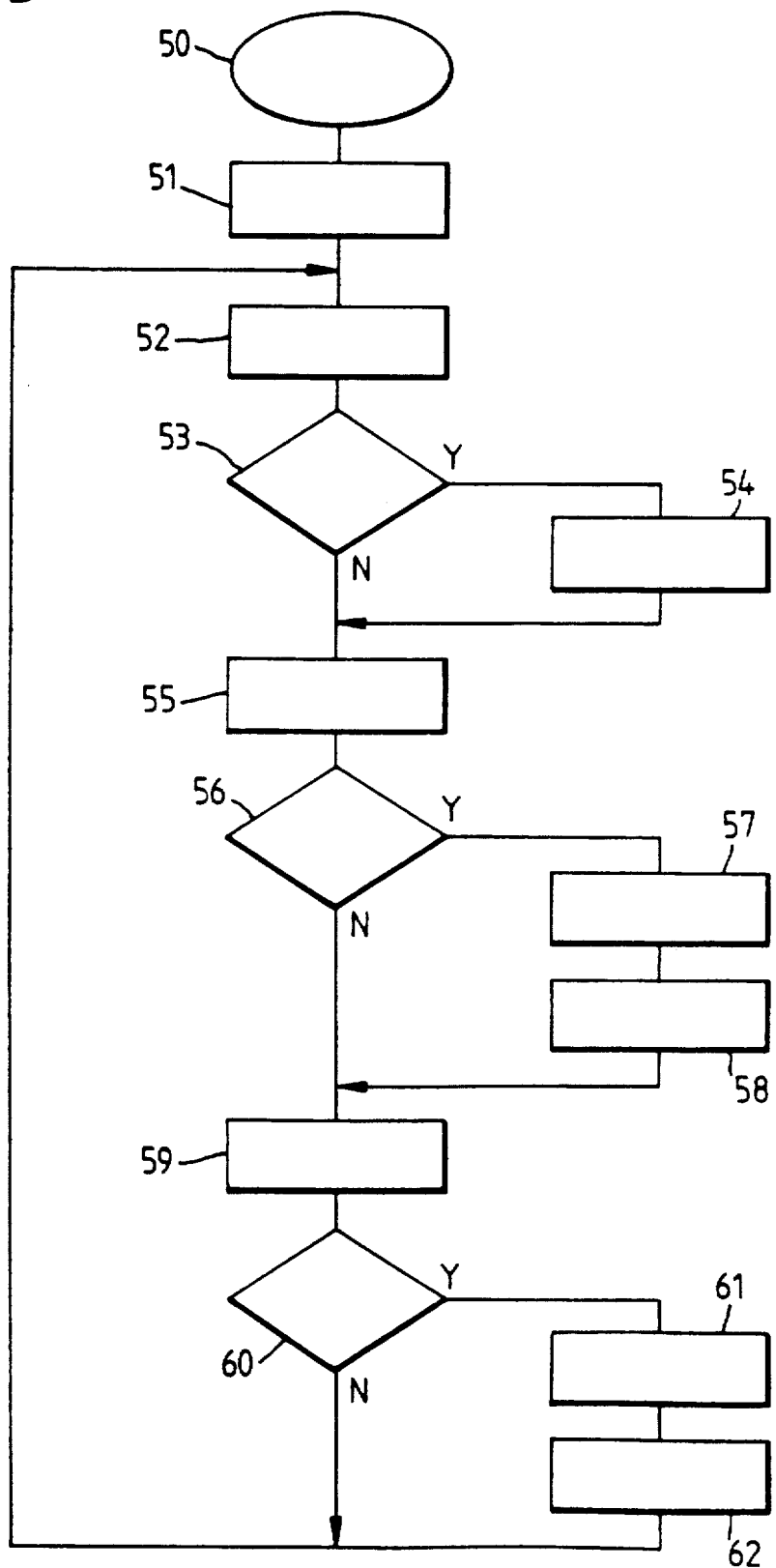
FIG. 2 is a flow chart illustrating the operation of the embodiment of FIG. 1.

An example of the parts of the program with which microcomputer 1 may be is programmed which are relevant to the present invention is shown in FIG. 2, which takes the form a of flow chart. In this Figure the various blocks have the following significances.

50—Start. (A reset signal applied to reset input RST of microcomputer 1 in FIG. 1 results in a return of the program to this stage).
51—Initialise, including the writing of byte X (see the description of FIG. 1) to a specific address AD in RAM and the setting of flags F1 and F2 to logic "0".
52—Part of main program.
53—Is output Qn-1 of counter 17 in FIG. 1 logic "1"?
54—Set flag F1 to logic "1".
55—Part of main program
56—Is flag F1 logic "1"?
57—Write contents of RAM address AD to watch-dig.
58—Set flag F2 to logic "1". Set flag F1 to logic "0".
59—Part of main program.
60—Is flag F2 logic "1"?
61—Complement contents of RAM address AD.
62—Set flag F2 to logic "0".

After START (stage 50) the byte X is written in step 51 to a location AD in RAM which is preferably one which is likely to be overwritten should the program malfunction. Moreover a flag F1 which is used to indicate when the signal at output Qn-1 of counter 17 has been determined as being logic "1" is set to logic "0" as is a flag F2 which is used to indicate when the watch-dog has been written to. Then (step 52) part of the main program of the microcomputer is carried out. It is then tested in step 53 whether output Qn-1 is logic "1", microcomputer 1 first generating address byte Z on its outputs AD0 ... AD7 and the byte to which decoder 12 responds on its outputs A8 ... A15, and then logic "0"

on its output RD (read mode), reading the output signal of the thus enabled buffer 18 on its outputs/inputs AD0 ... AD7. If Qn-1 is "1" (Y) flag F1 is set to "1" in step 54, and in any case another part of the main program is then carried out in block 55. After this is ascertained in step 56 whether flag F1 is set, i.e. whether it was determined in step 53 that Qn-1 was logic "1". If it was (Y), the contents of RAM address AD (initially byte X, for example 01010101), are written to the watch-dog in step 57 (and also rewritten to the address AD) microcomputer 1 first generating address byte Z on its outputs AD0 ... AD7 and the byte to which decoder 12 responds on its outputs A8 ... A15, and then logic "0" on its output WR (write mode) and the byte X from RAM address AD on its outputs AD0 ... AD7. In normal operation, when step 57 occurs, output Qn-1 will still be logic "1", resulting in counter 17 being reset, changing over flip-flop 14, but no general reset occurring. Flag F1 is then reset and flag F2 is set to "1" (block 58) indicating that the watch-dog has been written to. The program then proceeds to block 59, as it does directly from step 56 if it is found there that flag F1 is not set (N). Block 59 represents the next part of the main program, after which flag F2 is tested (step 60) to ascertain if step 57 in fact took place. If it did (Y) the byte in RAM address AD is complemented and rewritten in step 61 so that it becomes Y to conform with the new state of multiplexer 13, after which flag F2 is reset in step 62 and the program proceeds back to block 52, as it does directly if the result of test 60 is "no" (N).

In order that, if the result of test 53 is "yes", output Qn-1 of counter 17 will still be "1" when step 57 is performed it is arranged that, provided the system is operating correctly, the time interval between successive pairs of tests 53 plus the time to the next step 57 if it is in fact carried out is always less then one half the period of the signal appearing at output Qn-1 of counter 17.

If required, a delay element (not shown) may be provided at the output of gate 69 in FIG. 1 to ensure that any reset signal produced thereat has a sufficiently long duration before the counter 17 or flip-flop 15 which may have given rise to it is itself reset.

It will be appreciated that the parts of the system shown in FIG. 1, other than the microcomputer 1, may be very conveniently all be integrated on the same semiconductor chip.

From reading the present disclosure, various modifications will be apparent to persons skilled in the art. Such modifications may involve other features which are already known in the design, manufacture and use of systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relate to the same invention as presently claimed in any claim and whether or not it mitigates any or all of the same technical problems as does the present invention. The applicants hereby given notice that claims may be formulated to such features and/or combinations of such features in any further application which may derive herefrom or otherwise.

I claim:

1. A digital data processing system comprising:
   (a) a watch-dog circuit, which circuit comprises:
      (i) timer means; and
      (ii) a reset signal input coupled to the timer means; said watch-dog circuit generating:
      (iii) an output signal when
         (A) a time interval between successive resets of said timer means exceed a predetermined length; or
         (B) a reset signal is supplied to said reset signal input while a further signal is absent; and
      (iv) the further signal, at time intervals which do not exceed said predetermined length; and
   (b) a system program for:
      (i) supplying a reset signal to said reset signal input, and thereby resetting the timer means, during each occurrence of said further signal; and
      (ii) responding to said output signal by assuming a predetermined state, wherein said system is further for:
      (iii) periodically testing for the presence of said further signal,
      (iv) responding to such presence being detected by supplying a reset signal to said reset signal input while said further signal is still present, and
      (v) performing program steps unrelated to the watchdog circuit between each detection of the presence of said further signal and the subsequent supply of the reset signal in response.

2. A programmed digital data processing system comprising:
   (a) a watchdog circuit including
      (i) resettable timer means;
      (ii) a reset signal input for receiving successive reset signals to reset the timer means; and
      (iii) means for supplying an output signal when a time interval between successive reset signals exceeds a predetermined length; and
      (iv) means for supplying a further signal at intervals which do not exceed said predetermined length, the output signal supplying means also supplying the output signal when the reset signal input receives a reset signal while the further signal is absent;
   (b) means for periodically testing for the further signal;
   (c) means, responsive to the periodically testing means, for subsequently supplying a corresponding one of the successive reset signals while the further signal is still present, which corresponding one of the successive reset signals corresponds to a finding by the periodically testing means that the further signal is still present;
   (d) means for assuming a predetermined state in response to the output signal; and
   (e) means for enabling performance of program steps unrelated to the watchdog circuit between each detection of said further signal and the corresponding subsequent supply of a reset signal.

3. A system as claimed in claim 2, wherein
   (a) each said reset signal is supplied in the form of a multibit word having a predetermined value, and
   (b) said circuit additionally generates said output signal when a reset signal supplied to the reset signal input does not have the predetermined value.

4. A system as claimed in claim 3, wherein the predetermined value changes for successive reset signals in accordance with a cyclic sequence.

5. A system as claimed in claim 4, wherein the sequence consists of two predetermined values each of which is a complemented version of the other.

6. A system as claimed in claim 5, further comprising a random access memory for storing the multibit word, from which random access memory the multibit word is read and rewritten for each said reset signal.

7. As system as claimed in claim 6, wherein said multibit word is complemented during each interval between supply of successive reset signals.

8. A system as claimed in claim 7, wherein each such complementing operation is separated in time from each reset signal supply operation by program steps of a system program.

9. A system as claimed in claim 5, wherein each multibit word is a byte consisting of alternate "0"s and "1"s.

10. A system as claimed in claim 3, further comprising a random access memory for storing the multibit word, from which random access memory the multibit word is read and rewritten for each said reset signal.

11. A system as claimed in claim 2, wherein instances of the further signal and the corresponding reset signals occur in an alternating series in which each further signal is present during a respective interval of time, the start of each interval during which the further signal is present having a predetermined delay with respect to the instant of occurence of the reset signal which immediately precedes it.

12. A system as claimed in claim 11, wherein
   (a) the timer means comprises a binary counter having a clock input and a reset input coupled to the reset signal input, said further signal being derived from a particular bit position or positions of the contents of the counter; and
   (b) the system further comprising clock pulse means for continuously clocking the binary counter.

13. A system as claimed in claim 2, further comprising means for strobing the watchdog circuit each time a reset signal is supplied to the reset signal input.

14. A system as claimed in claim 2, comprising a programmed microcomputer provided with an external address latch, the address latch and the watch-dog circuit being integrated on the same semiconductor chip.

15. A method for using a watchdog circuit, the method comprising the steps of:
   (a) initializing first and second flags (F1, F2) and a specific address (AD) of a RAM to respective initialized values;
   (b) executing program steps unrelated to the watchdog circuit;
   (c) testing whether an (n−1)th bit of an n-bit counter has reached a predetermined logic level;
   (d) changing the first flag to a respective changed value, upon a positive result of step (c);
   (e) executing further program steps unrelated to the watchdog circuit;
   (f) testing whether the first flag has the respective changed value of step (d);
   (g) upon a positive result of step (f):
      (I) writing contents of the specific address to the watchdog circuit;
      (II) setting the first flag back to the respective initialized value; and
      (III) setting the second flag to a respective changed value;
   (h) executing still further program steps unrelated to the watchdog circuit;
   (i) testing whether the second flag has the respective changed value of step (g) (III); and
   (j) upon a positive result of step (i):
      (I) complementing the contents of the specific address; and
      (II) setting the second flag back to the respective initial value.

* * * * *